US012689742B2

(12) United States Patent
D'Aleo et al.

(10) Patent No.: US 12,689,742 B2
(45) Date of Patent: Jul. 21, 2026

(54) SENSING SYSTEM AND METHOD

(71) Applicant: AMS-OSRAM ASIA PACIFIC PTE. LTD., Singapore (SG)

(72) Inventors: Francesco Paolo D'Aleo, Samstagern (CH); Peter Roentgen, Thalwil (CH); Kotaro Ishizaki, Zurich (CH); Nicola Spring, Oberterzen (CH)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 713 days.

(21) Appl. No.: 18/040,823

(22) PCT Filed: Aug. 19, 2021

(86) PCT No.: PCT/SG2021/050486
§ 371 (c)(1),
(2) Date: Feb. 7, 2023

(87) PCT Pub. No.: WO2022/045969
PCT Pub. Date: Mar. 3, 2022

(65) Prior Publication Data
US 2023/0319291 A1 Oct. 5, 2023

(30) Foreign Application Priority Data
Aug. 27, 2020 (GB) ..................................... 2013472

(51) Int. Cl.
*H04N 19/172* (2014.01)
*G02B 27/58* (2006.01)

(52) U.S. Cl.
CPC ........... *H04N 19/172* (2014.11); *G02B 27/58* (2013.01); *G02B 2207/129* (2013.01)

(58) Field of Classification Search
None
See application file for complete search history.

(56) References Cited

U.S. PATENT DOCUMENTS

2005/0030625 A1* 2/2005 Cattin-Liebl ........... G01T 1/295
359/560
2006/0034003 A1 2/2006 Zalevsky
(Continued)

FOREIGN PATENT DOCUMENTS

CN 101014884 A 8/2007
JP 2009529160 A 8/2009
(Continued)

OTHER PUBLICATIONS

Chinese office action issued for the corresponding Chinese patent application No. 202180050432.1, dated Jun. 30, 2025, 5 pages (for informational purposes only).
(Continued)

*Primary Examiner* — Bao-Luan Q Le
*Assistant Examiner* — Danell L Owens
(74) *Attorney, Agent, or Firm* — VIERING, JENTSCHURA & PARTNER mbB

(57) ABSTRACT

A sensing system may include a first coded aperture configured to receive incident light and transmit a coded image of an object. The sensing system comprises a light replication component configured to detect the coded image and emit a replicated coded image. The sensing system may include a second coded aperture configured to receive the replicated coded image and transmit a decoded image. The sensing system may include a sensor configured to detect the decoded image.

12 Claims, 7 Drawing Sheets

(56)            References Cited

U.S. PATENT DOCUMENTS

| | | | |
|---|---|---|---|
| 2007/0023665 A1* | 2/2007 | Gallagher | G01T 3/00 |
| | | | 250/358.1 |
| 2009/0020714 A1 | 1/2009 | Slinger | |
| 2009/0167922 A1 | 7/2009 | Perlman et al. | |
| 2011/0079725 A1 | 4/2011 | Tobin, Jr. et al. | |
| 2011/0315855 A1 | 12/2011 | Perlman et al. | |
| 2018/0341858 A1* | 11/2018 | Otterstedt | G06V 10/143 |
| 2020/0081142 A1 | 3/2020 | Shutler et al. | |
| 2020/0084350 A1 | 3/2020 | Kishine et al. | |
| 2020/0261034 A1 | 8/2020 | Mu | |
| 2020/0404180 A1* | 12/2020 | Dayton | H04N 23/30 |

FOREIGN PATENT DOCUMENTS

| | | | | |
|---|---|---|---|---|
| WO | 2013124664 A1 | 8/2013 | | |
| WO | 2018221019 A1 | 12/2018 | | |
| WO | WO-2020094016 A1 * | 5/2020 | | G09G 3/36 |

OTHER PUBLICATIONS

Search Report by Registered Organization issued for the corresponding JP patent application No. JP2023-513182 dated Mar. 6, 2024, 13 pages (For informational purposes only).
International Search Report issued for the corresponding PCT patent application No. PCT/SG2021/050486, dated Nov. 26, 2021, 2 pages (For informational purposes only).

* cited by examiner

500

550

600

610

620

SENSING SYSTEM AND METHOD

CROSS-REFERENCE TO RELATED APPLICATIONS

The present application is a national stage entry according to 35 U.S.C. § 371 of PCT application No.: PCT/SG2021/050486 filed on Aug. 19, 2021; which claims priority to British patent application GB 2013472.2, filed on Aug. 27, 2020; all of which are incorporated herein by reference in their entirety and for all purposes.

TECHNICAL FIELD OF THE DISCLOSURE

The disclosure relates to a sensing system and method, particularly but not exclusively to a coded aperture sensing system for detecting images. The sensing system may be incorporated into an electronic device such as a mobile phone or tablet computer.

BACKGROUND OF THE DISCLOSURE

The present disclosure relates to a sensing system suitable for detecting an image. A well-known example of a simple sensing system for detecting an image is a pinhole camera. A pinhole camera comprises a single aperture (i.e. the pinhole). The pinhole receives incident light and transmits a single inverted image that may detected by eye or by sensor. The amount of light transmitted by the pinhole at least partially determines a signal-to-noise ratio of the pinhole camera. Increasing the size of the pinhole reduces a resolution of the pinhole camera (e.g. blurring occurs proximate edges of the detected image). Decreasing the size of the pinhole reduces the signal (i.e. less light is transmitted through the smaller pinhole) and the resolution of the pinhole camera eventually becomes diffraction limited.

To overcome at least some of the limitations of a pinhole camera, the pinhole may be replaced with a coded aperture. A coded aperture is a substrate comprising an optical coding pattern of substantially opaque areas and substantially transparent areas. Coded apertures transmit a greater amount of light than a pinhole because the image incident on the coded aperture is transmitted by each of the substantially transparent areas and is thereby replicated multiple times (corresponding to the number of substantially transparent areas). More light is transmitted through multiple apertures, and so the coded aperture enables a greater signal-to-noise ratio than the pinhole camera. However, the sensor receives a plurality of overlapping inverted images that arrive at the sensor surface from different angles. That is, the sensor receives a coded image that is a convolution of an optical coding pattern of the coded aperture and the image that is to be detected. In order to understand the sensed coded image and reconstruct the image to be detected, the coded image is decoded using knowledge of the optical coding pattern of the coded aperture.

An example of a known sensing system 100 is schematically depicted in FIG. 1. The known sensing system 100 comprises a coded aperture 110 configured to receive incident light and transmit a coded image. The coded aperture 110 comprises an optical coding pattern of substantially transmissive areas and substantially opaque areas. Light passing through the substantially transmissive areas forms the coded image. The coded image may comprise a plurality of inverted and overlapping images of an object 130 illuminated by the incident light. The known sensing system 100 further comprises a sensor 120 configured to detect the coded image. The coded image comprises a convolution of an image of the object 130 and the pattern of the coded aperture 110. The sensor 120 is in communication with a processor 140. The processor 140 is configured to receive a signal from the sensor 120 that is indicative of the detected coded image. The processor 140 comprises a computational algorithm configured to mathematically decode the coded image to produce a reconstructed image of the object 130.

Some problems associated with such known sensing systems 100 are that the processor 140 is required to decode the coded image (i.e. to perform a complicated deconvolution of the pattern of the coded aperture 110 and the image of the object 130). The decoding algorithm is complex and very computationally demanding, requiring a large amount of processing time and a large amount of energy to perform.

It is therefore an aim of the present disclosure to provide a sensing system that address one or more of the problems above or at least provides a useful alternative.

SUMMARY

In general, this disclosure proposes to overcome the above problems by optically decoding the coded image using a light replication component and a second coded aperture. This arrangement advantageously reduces or avoids the need for complex computational algorithms because the decoding is performed optically using a second coded aperture. The light replication component advantageously reduces or avoids a loss of information that may otherwise occur using optical decoding.

According to one aspect of the present disclosure, there is provided a sensing system comprising a first coded aperture configured to receive incident light and transmit a coded image. The sensing system comprises a light replication component configured to detect the coded image and emit a replicated coded image. The sensing system comprises a second coded aperture configured to receive the replicated coded image and transmit a decoded image. The sensing system comprises a sensor configured to detect the decoded image.

The sensing system optically decodes the coded image rather than computationally. The coded image is received by camera/display pair (i.e. the light replication component), and a replicated image of the coded image is provided to an inverse filter mask (i.e. the second coded aperture) which is designed based on the first filter mask (i.e. the first coded aperture). The second coded aperture provides a deconvolution of the coded image and transmits a decoded image to a further camera (i.e. the sensor). In this way, the decoding is performed optically without resorting to computational processes involving complex algorithms.

Optical decoding the coded image may previously have been avoided in the technical field of coded aperture sensing systems for a number of reasons. These reasons may include, for example, perceived difficulties in fabricating the first and second coded apertures, perceived difficulties in using negative and variously scaled decoding coefficients, and ease of data storage for computational decoding. As such, known sensing systems use complex algorithms to reconstruct the image employing computational resources.

Highly complex and numerical computational image processing that is used in known sensing systems is replaced by optical processing in the present sensing system. The sensing system advantageously reduces or removes the need to create, store and implement complex computational algorithms for decoding the coded image. Reducing the computational burden of the sensing system advantageously allows a device comprising the sensing system (e.g. a mobile phone) to focus on other tasks, thereby freeing up data space. Furthermore, optical decoding uses less energy than computational decoding thereby improving an efficiency of the sensing system. The reduced energy usage makes the sensing system suitable for use in mobile devices that use portable energy sources (e.g. a battery) that would otherwise struggle with the demands of computational decoding.

The light replication component may emit a replicated coded image towards the second coded aperture such that substantially no light is lost during the coding and decoding processes. That is, all of the information carried by the incident light is used to reconstruct an image of an object. Thus, the light replication component advantageously avoids information loss, thereby improving a signal-to-noise ratio of the sensing system.

The sensing system achieves all the benefits (such as improved signal-to-noise ratio) of coded apertures whilst avoiding the main drawback of the high computational load involved in computational decoding. The sensing system can be made smaller than known sensing systems and may be implemented on an integrated circuit chip.

An optical coding pattern of the second coded aperture may be an inverse pattern of an optical coding pattern of the first coded aperture.

The first coded aperture and/or the second coded aperture may comprise a random optical coding pattern.

Using a randomly generated optical coding pattern advantageously enables greater design flexibility of the first and/or second coded apertures.

The first coded aperture and/or the second coded aperture may comprise a Uniformly Redundant Array or a Modified Uniformly Redundant Array.

Uniformly Redundant Array (URA) and Modified Uniformly Redundant Array (MURA) are families of mask patterns that scale with prime numbers. Whilst they offer less design flexibility than randomly generated patterns, URA and MURA produce less measurement noise than randomly generated patterns.

The first coded aperture and/or the second coded aperture may comprise a Fresnel Zone Plate, an Optimized Random pattern, a Uniformly Redundant Array, a Hexagonal Uniformly Redundant Array, Modified Uniformly Redundant Array, etc.

The first coded aperture and the second coded aperture may comprise substantially identical patterns.

Using substantially identical first and second coded apertures advantageously simplifies the sensing system and avoids the need to produce coded apertures having drastically different patterns. A grid pattern of the first coded aperture may differ from a grid pattern of the second coded apertures by a single grid and still be considered to be substantially identical.

The first coded aperture and/or the second coded aperture may comprise a controllable display.

The controllable display may comprise a liquid crystal display (LCD).

Using a coded aperture having a coded display advantageously allows the coded aperture to be adapted to a given scenario. For example, a size of the substantially transparent portions and/or the substantially opaque portions of the first and/or second coded apertures may be increased or decreased using the controllable display(s). As another example, using the controllable display to replicate the pattern of the first coded aperture and/or the second coded aperture multiple times may be used to achieve a fully coded field of view in which all directions of incident flux are completely modulated by the first and/or second coded apertures. As a further example, using the controllable display to apply multiple patterns having different amount of blurring on the first coded aperture and/or the second coded aperture may increase a speed with which a depth map of the object may be reconstructed by the sensing system.

The second coded aperture may be mounted on the sensor.

Mounting the second coded aperture on the sensor advantageously reduces a size of the sensing system.

The light replication component may comprise an incident light receiving surface and an opposed light emitting surface.

The light replication component may comprise a substantially transparent planar substrate. The light replication component may comprise one or more bipolar junction transistors provided on said substrate, the or each transistor comprising a collector region adjacent to said light receiving surface, an emitter region adjacent to said light emitting surface, and a base region between said collector region and said emitter region. The light replication component may comprise circuitry for biasing the bipolar transistors in use. The or each transistor may be configured and biased in use so that said collector and base regions of the transistor operate as a photodiode whilst said base and emitter regions operate as a light emitting diode.

The or each transistor may be configured and biased so as to amplify the intensity of the emitted light relative to the incident light. The light replication component may comprise a plurality of said bipolar junction transistors arranged as a two dimensional array across said planar substrate. The plurality of bipolar transistors may be provided as elevated discrete structures on said planar substrate. The collector region may be disposed adjacent to said planar substrate and the planar substrate provides said incident light receiving surface. One or both of said light receiving surface and said light emitting surface may comprise an anti-reflection coating. The transparent planar substrate may comprise sapphire. The transistors may comprise gallium-arsenide or indium-phosphide devices. The light replication component may comprise a Lambertian surface.

The light replication component may comprise an organic photodiode, an organic phototransistor or an organic light emitting diode.

Using an organic photodiode, an organic phototransistor or an organic light emitting diode may advantageously improve a flexibility of the light replication component.

According to another aspect of the present disclosure, there is provided an electronic device comprising the sensing system. The electronic device may be a mobile phone, a tablet computer, an interactive display, etc.

According to another aspect of the present disclosure, there is provided a method of sensing light comprising using a first coded aperture to receive incident light and transmit a coded image. The method comprises detecting the coded image and emitting a replicated coded image. The method comprises using a second coded aperture to receive the replicated coded image and transmit a decoded image. The method comprises detecting the decoded image.

According to another aspect of the present disclosure, there is provided a computer program comprising computer readable instructions configured to cause a computer to carry out the preceding method.

According to another aspect of the present disclosure, there is provided a computer readable medium carrying the preceding computer program.

Different features of different aspects may be combined in different ways.

US 12,689,742 B2

5

BRIEF DESCRIPTION OF THE DRAWINGS

Some embodiments of the disclosure will now be described by way of example only and with reference to the accompanying drawings, in which.

DETAILED DESCRIPTION

Generally speaking, the disclosure provides a sensing system that utilizes first and second coded apertures to optically code and optically decode an image of a scene and/or an object to be detected. The image is acquired first by sensor component of a light replication component, which represents the convolution of the object image and a known pattern of the first coded aperture. The coded image is then re-irradiated by means of an emission component of the light replication component through a second coded aperture (e.g. having an inverse pattern to the first coded aperture). The second coded aperture is configured to perform a deconvolution of the coded image. In this way, the final sensor receives and detects a reconstructed, decoded image of the object.

Some examples of the solution are provided in the accompanying figures.

Figure 1:
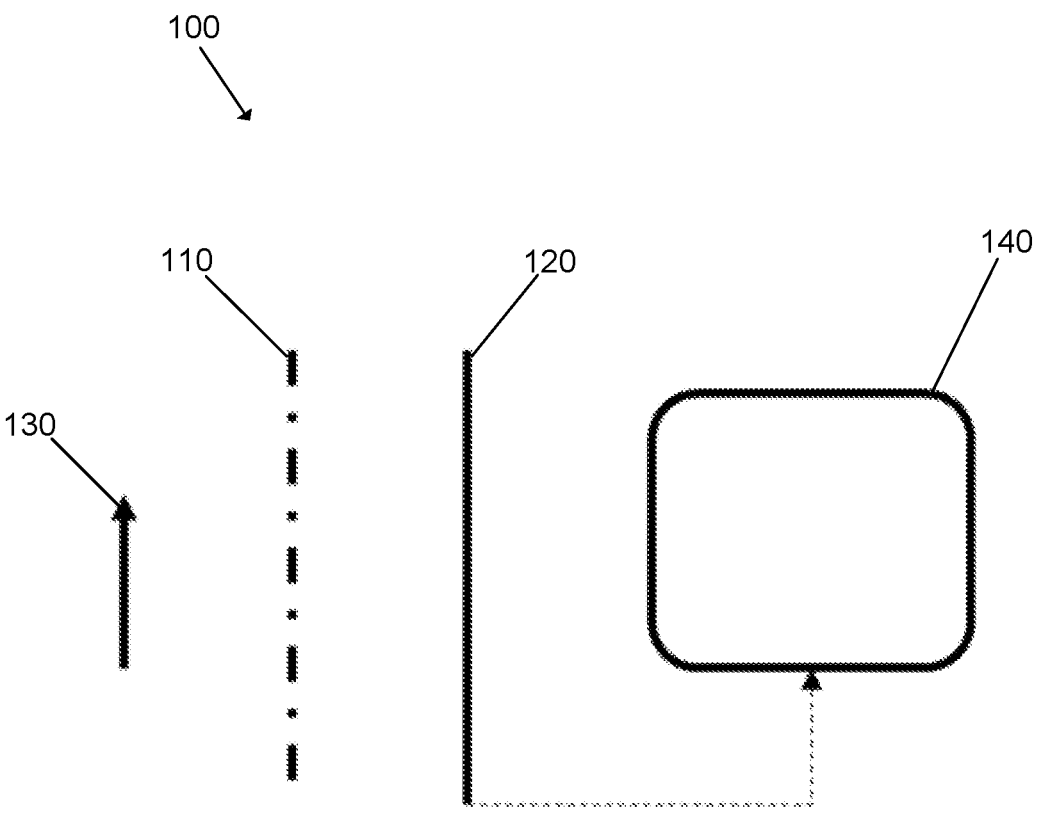
FIG. 1 schematically depicts a known sensing system.
Figure 2:
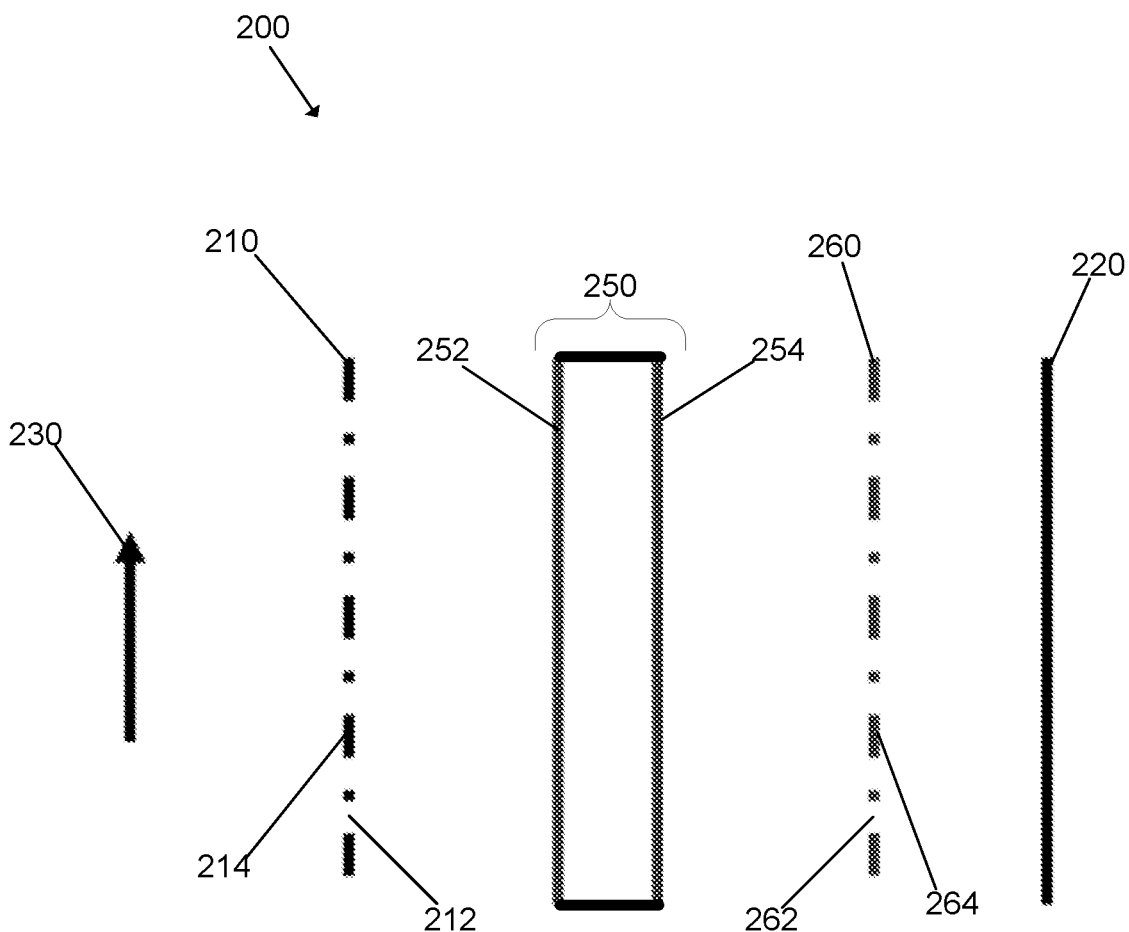
FIG. 2 schematically depicts a sensing system in accordance with the present disclosure.

FIG. 2 schematically depicts a sensing system 200 in accordance with the present disclosure. The sensing system 200 comprises a first coded aperture 210. The first coded aperture 210 is configured to receive incident light and transmit a coded image. The first coded aperture 210 comprises a pattern of substantially transmissive areas 212 and substantially opaque areas 214. Light passing through the substantially transmissive areas 212 forms the coded image. The coded image comprises a convolution of an image of the object 230 and an optical coding pattern (e.g. an intensity point spread function) of the first coded aperture 230. The coded image may comprise a plurality of inverted and overlapping images of the object 230 that propagate across a range of angles.

The sensing system 200 comprises a light replication component 250 configured to receive and detect the coded image and emit a replicated coded image. The light replication component 250 comprises an incident light receiving surface 252 and an opposed light emitting surface 254. The light receiving surface 252 receives the coded image transmitted by the first coded aperture 210. The light receiving surface 252 may comprise an intermediary sensor configured to detect the coded image. The intermediary sensor may comprise a plurality of sensing elements such as, for example, photodiodes, charge couple devices (CCDs) and/or complementary metal-oxide-semiconductor (CMOS) based sensors. The plurality of sensing elements may be arranged to form an array, e.g. a grid array. The coded image comprises a convolution of an image of the object 230 and the optical coding pattern of the first coded aperture 210.

The light emitting surface 254 may comprise an emitter configured to emit a replicated coded image. That is, the light emitting surface 254 may receive information indicative of the coded image detected by the light receiving surface 252 and use the information to reconstruct and emit a replicated coded image. The emitter may comprise a plurality of light emitting elements such as light emitting diodes (LEDs), light emitting transistors (LETs), etc. The plurality of emitting elements may be arranged to form an array, e.g. a grid array. An example of a light replication component 250 is described in more detail with reference to FIG. 3.

The sensing system 200 comprises a second coded aperture 260. The second coded aperture 260 is configured to receive the replicated coded image emitted by the light replication component 250 and transmit a decoded image. The second coded aperture 260 comprises an optical coding pattern of substantially transmissive areas 262 and substantially opaque areas 264. Light passing through the substantially transmissive areas 262 forms the decoded image. The decoded image may comprise a reconstruction of the image of the object 230. Decoding the coded image may be performed using a variety of methods such as, for example, deconvolution, correlation and/or Fresnel diffraction.

Deconvolution may be generally applicable for decoding an image regardless of the arrangement of the first coded aperture 210. Deconvolution may comprise performing a Fourier transform and/or an inverse Fourier transform of the first coded aperture 210. Deconvolution may comprise applying a Wiener filter that presumes at least some knowledge of measurements noise that effects the coded image. Deconvolution may comprise using a matched filter technique that presumes at least some knowledge of the arrangement of the first coded aperture 210. Correlation may involve performing a cross correlation function involving the coded image and the optical coding pattern of the first coded aperture 210. Correlation may be particularly effective when the first coded aperture 210 comprises a Uniformly Redundant Array (URA) or a Modified Uniformly Redundant Array (MURA). Such coded apertures may produce a Dirac delta function when convolved (or cross-correlated) with themselves (i.e. a matched filtering process). A Fresnel diffraction approximation may be used as a far-field approximation in which the object 230 is far away enough from the sensing system 200 that incident light rays can be considered to be substantially parallel.

A reconstruction of the original image of the object 230 may be obtained through a deconvolution involving the coded image and the first coded aperture 210. In mathematical terms, the coded image R detected by the light receiving surface 252 of the light replication component 250 may take the following form:

$$R = O * A \qquad \text{Equation 1}$$

where O represents an image of the object 230 and A represents the optical coding pattern of the first coded aperture 210. The first coded aperture 210 may be designed (e.g. as an URA or MURA coded aperture) to satisfy the following equation:

$$A * A = 8 \qquad \text{Equation 2}$$

where 8 is a Dirac delta function. By designing a first coded aperture 210 that satisfies Equation 2, and by designing the second coded aperture 260 to be substantially identical to the first coded aperture 210 (i.e. both may be represented by the same variable A), a convolution of the coded image with the second coded aperture 260 may be represented by the following relationship:

$$R * A = O * A * A = O * (A * A) = O * 8 = O* \qquad \text{Equation 3}$$

where O* is the decoded image (i.e. reconstructed image) of the object 230. That is, an autocorrelation of the first and second coded apertures 210, 260 acts to decode the coded image, thereby reconstructing an image of the object 230 at the sensor 220.

The reconstructed image (i.e. the decoded image) may comprise a convolution of the object 230 and an autocorrelation of the first and second coded apertures 210, 260. The reconstructed image of the object 230 may contain artefacts unless the autocorrelation results in a Dirac delta function (i.e. a substantially perfect inverse of the first coded aperture 210). As such, the optical coding pattern of the second coded aperture 260 may at least partially depend upon the optical coding pattern of the first coded aperture 210. That is, the pattern of the second coded aperture 260 may be configured to reverse the convolution of the image of the object 230 performed by the pattern of the first coded aperture 210.

The sensing system 200 comprises a sensor 220. The sensor 220 is configured to detect the decoded image transmitted by the second coded aperture 260. The sensor 220 may comprise a plurality of sensing elements such as, for example, photodiodes, CCDs and/or CMOS based sensors. The plurality of sensing elements may be arranged to form an array, e.g. a grid array. The sensor 220 receives an image of the object 230 that has been optically coded by the first coded aperture 210 and subsequently optically decoded by the second coded aperture 260, thus avoiding the need for a complex decoding algorithm.

A size of the sensing system 200 (i.e. sizes of the first coded aperture 210, the light replication component 250, the second coded aperture 260 and the sensor 220) may be selected to incorporate the sensing system 200 into a given electronic device (e.g. a mobile phone).

Figure 3A:
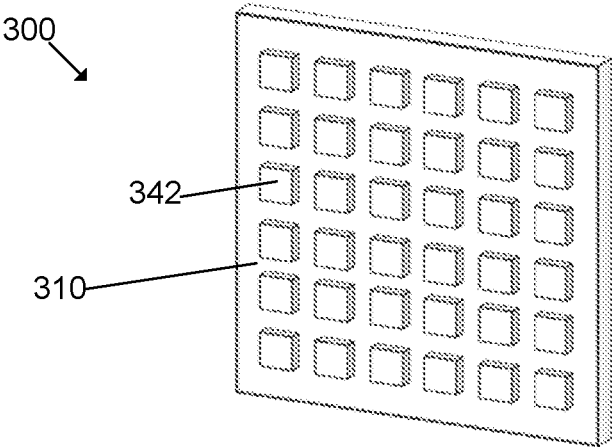
FIGS. 3A-3C schematically depict three different views of a light replication component in accordance with the present disclosure.
Figure 3B:
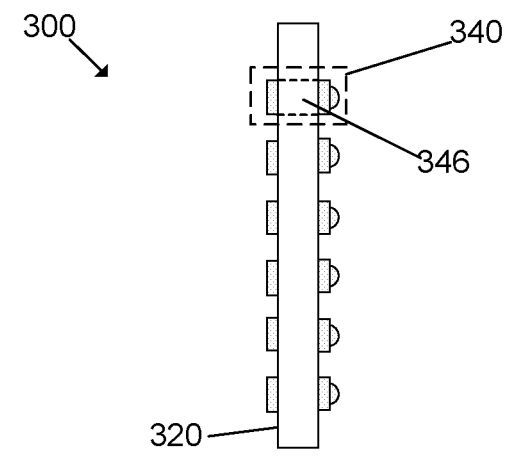
Figure 3C:
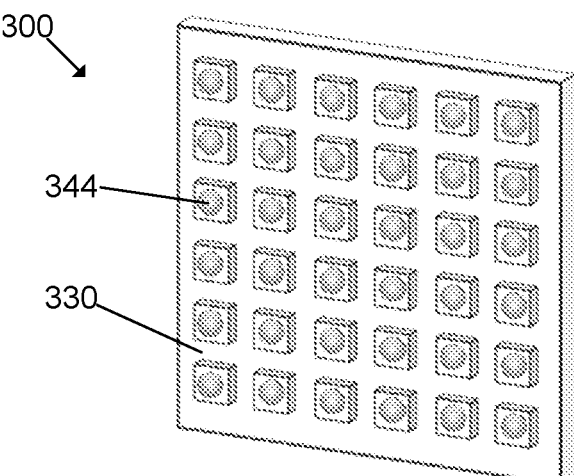

FIGS. 3A-3C schematically depict three different views of a light replication component 300 in accordance with the present disclosure. FIG. 3A schematically depicts a view of a light receiving surface 310 of the light replication component 300. FIG. 3B schematically depicts a view from the side of the light replication component 300. FIGS. 3A-3C schematically depict a view of a light emitting surface 330 of the light replication component 300.

In the example of FIGS. 3A-3C, the light replication component 300 comprises a planar substrate 320. The substrate 320 may be substantially transparent. A plurality of bipolar junction transistors 340 are provided on the substrate 320. Each transistor 340 comprises a collector region 342 adjacent to the light receiving surface 310. Each transistor 340 further comprises an emitter region 344 adjacent to the light emitting surface 330. Each transistor 340 further comprises a base region 346 located between the collector region 342 and the emitter region 344. The light replication component 300 comprises circuitry (not shown) configured to bias the bipolar transistors 340 when the light replication component 300 is in use. Each transistor 340 may be configured and biased in use so that the collector region 342 and base region 346 of the transistor 340 operate as a photodiode whilst the base region 346 and emitter region 344 operate as a light emitting diode. The array of emitter regions 344 are configured to reproduce and emit the coded image (i.e. the convolution of the first coded aperture and the object to be imaged) towards the second coded aperture of the sensing system.

The light replication component 300 may comprise alternative elements. For example, the light replication component 300 may comprise an array of phototransistors paired with an array of LEDs. The LEDs on the light emitting surface 330 may be driven (e.g. linearly driven) by the light sensed by the phototransistors on the light receiving surface 310. Alternatively, the light replication component 300 may comprise an array of organic photodiodes or phototransistors paired with an array of organic LEDs (OLEDs) to provide an organic version of the light replication component 300.

Figure 4A:
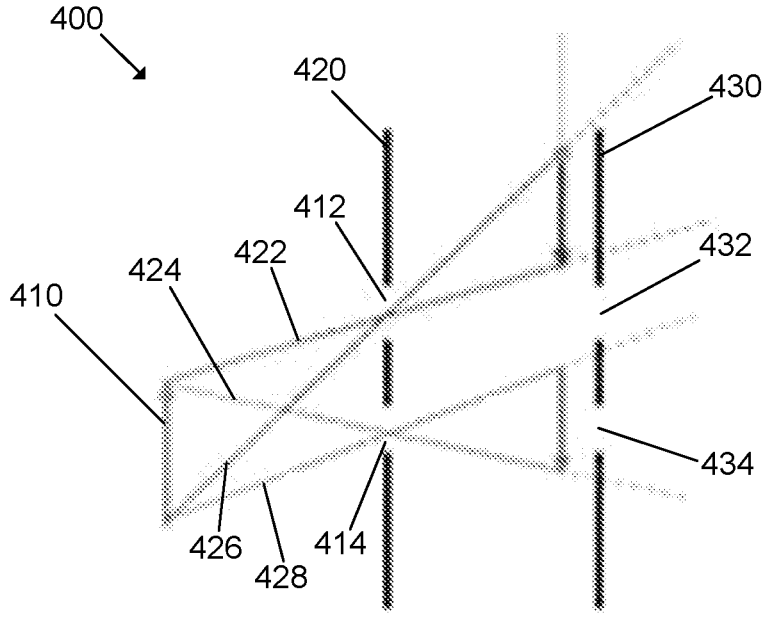
FIGS. 4A-4B schematically depict two optical arrangements that demonstrate a retention of optical information achieved when using a light replication component.
Figure 4B:
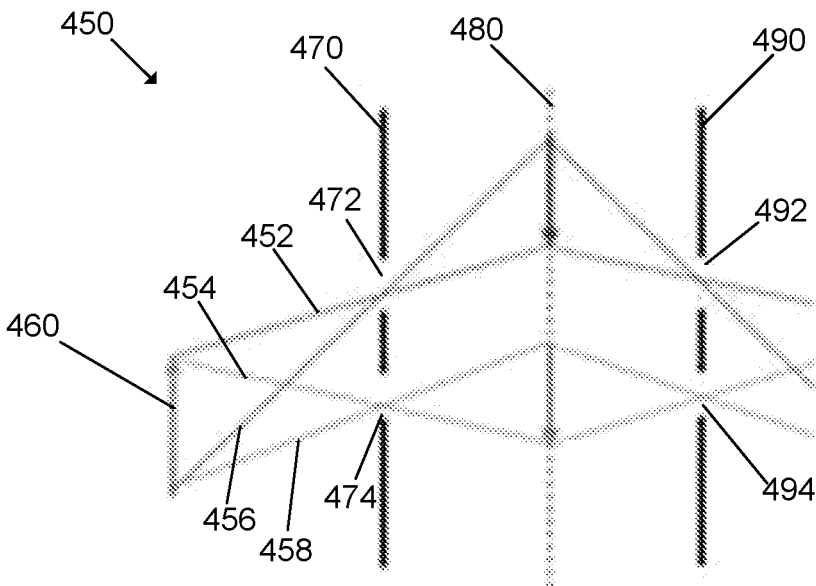

FIGS. 4A-4B schematically depict two optical arrangements that demonstrate a retention of information provided by the light replication component. FIG. 4A schematically depicts an optical arrangement 400 that does not include a light replication component. FIG. 4B schematically depicts an optical arrangement 450 that includes a light replication component 480. With reference to FIG. 4A, light illuminates an object 410 and passes through first and second transmissive portions 412, 414 of a first coded aperture 420. A first ray of light 422 propagates from a first end of the object 410 through the first transmissive portion 412 and a second ray of light 424 propagates from the first end of the object 410 through the second transmissive portion 414. A third ray of light 426 propagates from a second end of the object 410 through the first transmissive portion 412 and a fourth ray of light 428 propagates from the second end of the object 410 through the second transmissive portion 414. A second coded aperture 430 is configured to receive light transmitted by the first coded aperture 420. However, the first to fourth rays of light 422-428 do not reach first and second transmissive portions 432, 434 of the second coded aperture 430. As such, optical information carried by the first to fourth rays of light 422-428 is lost, thereby decreasing a signal-to-noise ratio of the system 400. That is, a significant portion of light would not reach a sensor located behind the second coded aperture 430.

With reference to FIG. 4B, light illuminates an object 460 and passes through first and second transmissive portions 472, 474 of a first coded aperture 470. A first ray of light 452 propagates from a first end of the object 460 through the first transmissive portion 472 and a second ray of light 454 propagates from the first end of the object 460 through the second transmissive portion 474. A third ray of light 456 propagates from a second end of the object 460 through the first transmissive portion 472 and a fourth ray of light 458 propagates from the second end of the object 460 through the second transmissive portion 474. A light replication component 480 receives the light transmitted by the first coded aperture 470. The coded image transmitted by the first coded aperture 470 is detected by the light replication component 480. The light replication component 480 emits a replicated coded image towards first and second transmissive portions 492, 494 of a second coded aperture 490 such that none of the rays of light 452-458 are lost from the system 450. That is, all of the optical information carried by the light 452-458 is used to reconstruct an image of the object 460. Thus, the light replication component 480 advantageously avoids information loss, thereby improving a signal-to-noise ratio of the system 450.

Figure 5A:
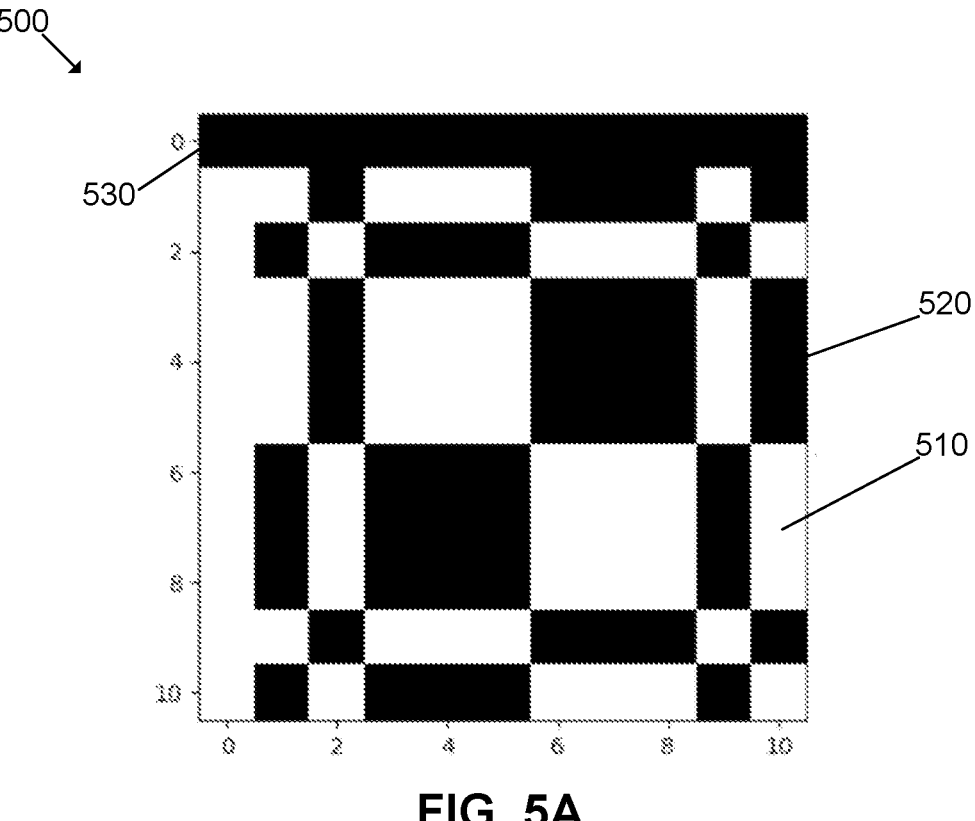
FIGS. 5A-5B schematically depict a first coded aperture optical coding pattern and a second coded aperture optical coding pattern in accordance with the present disclosure.
Figure 5B:
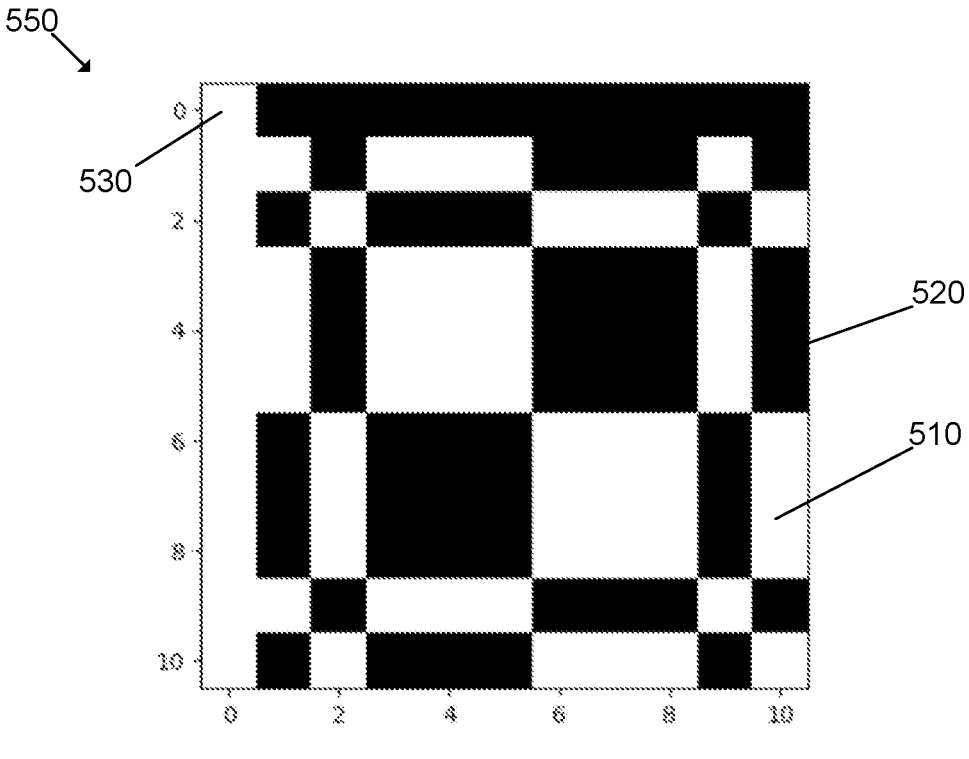

FIGS. 5A-5B schematically depict an example of a first coded aperture optical coding pattern 500 and an example of a second coded aperture optical coding pattern 550 in accordance with the present disclosure. The first and second coded apertures 500, 550 are depicted with grid axes starting from zero and ending at ten to form and eleven-by-eleven grid pattern. The first and second coded apertures 500, 550 comprise substantially transparent regions 510 (represented by white areas) and substantially opaque regions 520 (represented by black areas). In the example of FIGS. 5A-5B, the regions are shaped as squares or grids. In the example of FIGS. 5A-5B, both the first and second coded apertures 500, 550 comprise Modified Uniformly Redundant Arrays (MU-RAs). MURAs are a family of mask patterns that scale with prime numbers. MURAs may advantageously introduce less noise to the convolution and/or deconvolution of the coded image compared to other types of coded aperture.

In the example of FIGS. 5A-5B, the first coded aperture 500 is substantially identical to the second coded aperture 550. The only difference between the first and second coded apertures 500, 550 is the first pixel (i.e. the (0, 0) region) 530. In the first coded aperture 500 the first pixel 530 is substantially opaque. In the second coded aperture 550 the first pixel 530 is substantially transparent. The first coded aperture 500 may be designed in accordance with a MURA pattern using Legendre coefficients. The second coded aperture 550 may be designed in order to provide a substantially ideal deconvolution (i.e. a Dirac delta function) of the first coded aperture 500. In the example of FIGS. 5A-5B, changing the state of the first pixel 530 between the first and second coded apertures 500, 550 achieves the Dirac delta function (i.e. a substantially ideal deconvolution of the coded image).

Alternative patterns may be used. For example, the first coded aperture 500 and/or the second coded aperture 550 may comprise a random pattern or random array (e.g. an Optimized RAndom pattern (ORA)).

The first coded aperture 500 and/or the second coded aperture 550 may comprise a controllable display. The controllable display may, for example, comprise a liquid crystal display (LCD). A controllable display may be used to provide any desired coded aperture pattern. The first coded aperture 210 and/or the second coded aperture 260 may be adapted to a given scenario. For example, a size of the substantially transparent regions and/or the substantially opaque regions of the first and/or second coded apertures 210, 260 may be increased or decreased using the controllable display(s). As another example, using the controllable display to replicate the pattern of the first coded aperture 210 and/or the second coded aperture 260 multiple times may be used to achieve a fully coded field of view in which all directions of incident flux are coded by the first and/or second coded apertures 210, 260. That is, substantially all light that is directed towards the light receiving surface 252 of the light replication component 250 and/or the sensor 220 is modulated by the first coded aperture 210 and/or the second coded aperture 260, rather than a fraction of the light being lost (i.e. as is the case with a partially coded field of view). As a further example, using the controllable display to apply multiple patterns having different amount of blurring on the first coded aperture 210 and/or the second coded aperture 260 may increase a speed with which a depth map of the object 230 may be reconstructed using a measurement performed by the sensing system 200.

Figure 6:
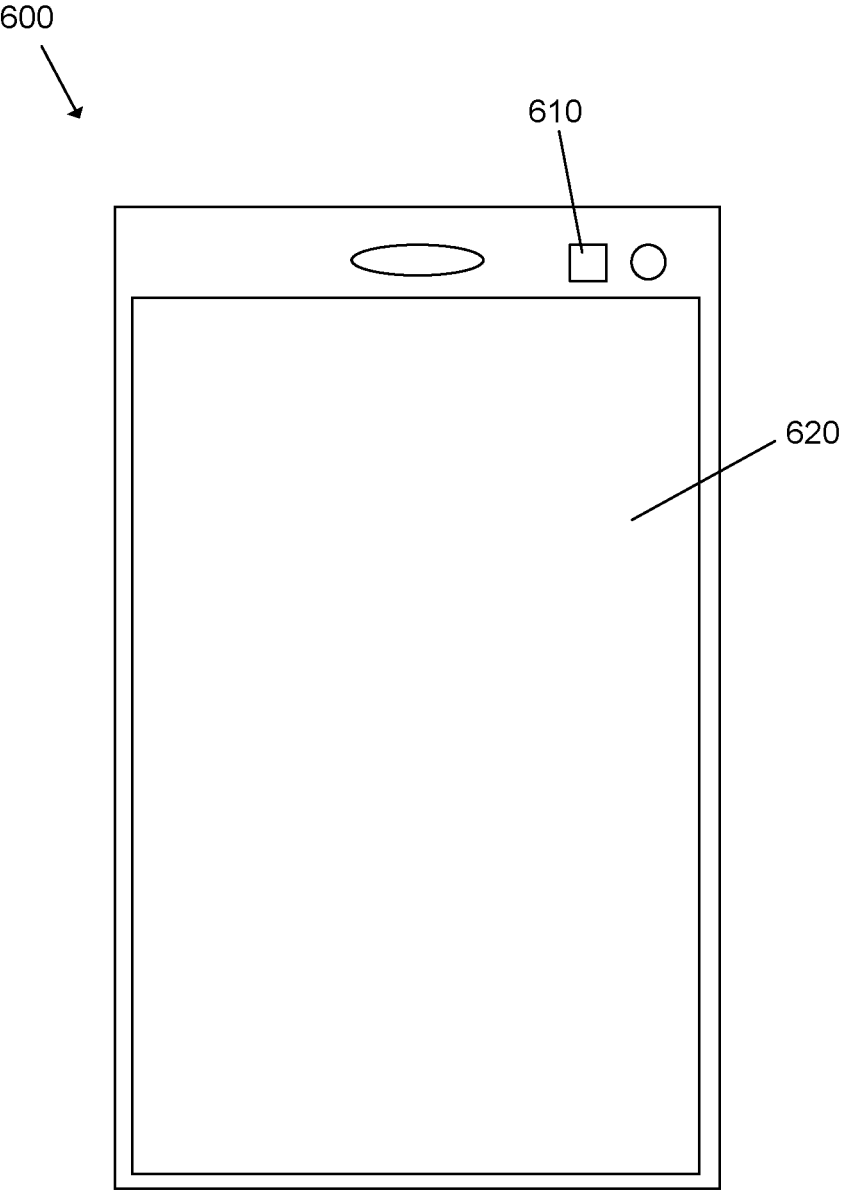
FIG. 6 schematically depicts an electronic device comprising the sensing system in accordance with the present disclosure; and, FIG. 7 shows a flowchart of a method of sensing light in accordance with the present disclosure.

FIG. 6 schematically depicts an electronic device 600 comprising the sensing system 610 in accordance with the present disclosure. In the example of FIG. 6, the electronic device 600 is a mobile phone. The mobile phone 600 may utilize the sensing system 610 to take photographs and/or videos that may be displayed on an electronic display 620 of the mobile phone 600. The mobile phone 600 may utilize the sensing system 610 to provide motion or gesture recognition and/or control functions. By reducing or avoiding the need for a complex computational algorithm to decode the coded image, the sensing system 610 may advantageously reduce an energy consumption of the mobile phone 600, thereby extending a battery life of the mobile phone 600.

Figure 7:
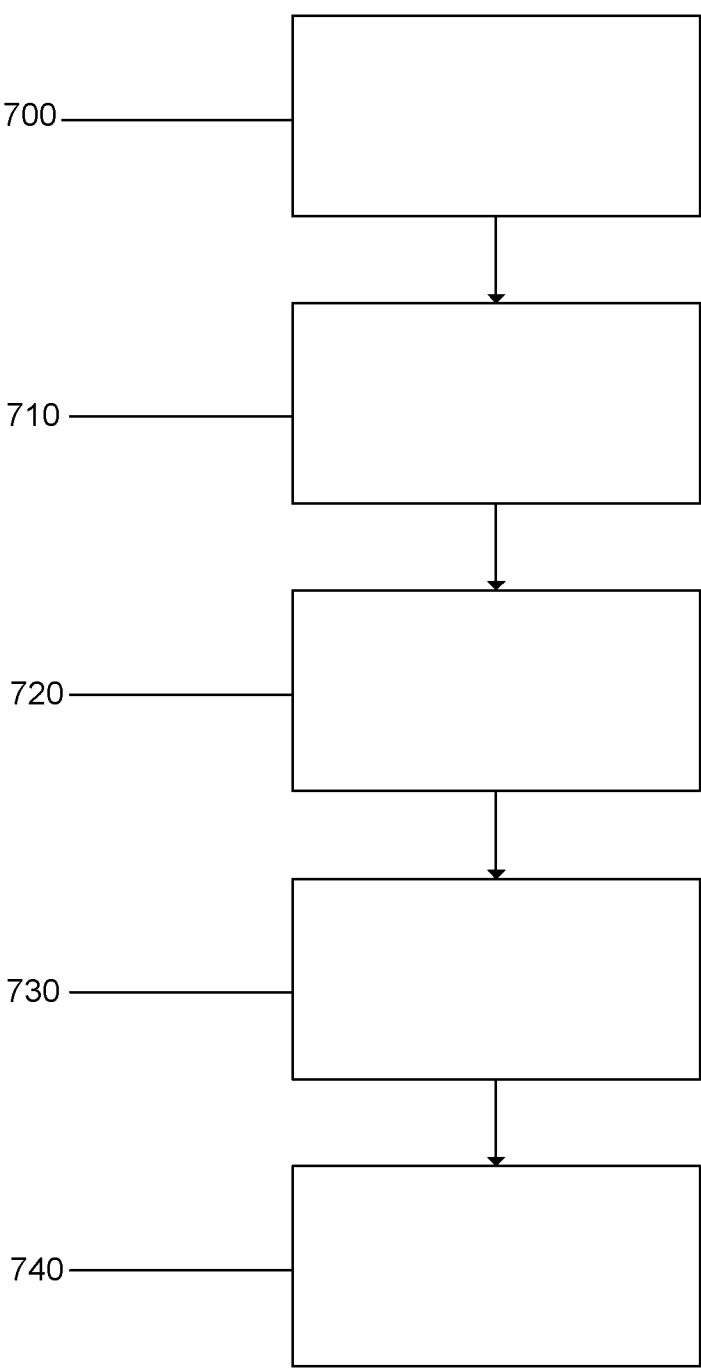

FIG. 7 shows a flowchart of a method of sensing light in accordance with the present disclosure. A first step 700 of the method comprises using a first coded aperture to receive incident light and transmit a coded image. A second step 710 of the method comprises detecting the coded image. A third step 720 of the method comprises emitting a replicated coded image. A fourth step 730 of the method comprises using a second coded aperture to receive the replicated coded image and transmit a decoded image. A fifth step 740 of the method comprises detecting the decoded image.

The sensing system of the present disclosure may form part of compact systems (e.g. the second coded aperture may be mounted on the sensor). The sensing system may not experience wavelength limitations. The sensing system may be implemented on curved and/or flexible surfaces. Embodiments of the present disclosure can be employed in many different electronic devices including, for example, camera systems, mobile phones, flexible electronic systems such as wearable technologies where energy saving might be a predominant factor. More applications include faster face recognition, faster gesture recognition, augmented reality, virtual reality, where a central processing unit (CPU) can be freed from complex image decoding algorithms. Images, depth maps of objects and/or scenes, dynamic video and/or four-dimensional light fields may be acquired from a measurement performed using the sensing system. Coded aperture based systems using compressive sensing principles may be used for super-resolution imaging, spectral imaging and/or video capture.

LIST OF REFERENCE NUMERALS

100 known sensing system
110 coded aperture
120 sensor
130 object
140 processor
200 sensing system
210 first coded aperture
212 transmissive area
214 opaque area
220 sensor
230 object
250 light replication component
252 light receiving surface
254 light emitting surface
260 second coded aperture
262 transmissive area
264 opaque area
300 light replication component
310 light receiving surface
320 substrate
330 light emitting surface
340 bipolar junction transistors 342 collector region
344 emitter region
346 base region
400 an optical arrangement that does not include a light replication component
410 object
412 first transmissive portion
414 second transmissive portion
420 first coded aperture
422 first ray of light
424 second ray of light
426 third ray of light
428 fourth ray of light
430 second coded aperture
432 first transmissive portion
434 second transmissive portion
450 an optical arrangement that includes a light replication component
452 first ray of light
454 second ray of light
456 third ray of light
458 fourth ray of light
460 object
470 first coded aperture
472 first transmissive portion
474 second transmissive portion
480 light replication component
490 second coded aperture
492 first transmissive portion
494 second transmissive portion
500 first coded aperture optical coding pattern
510 transmissive region
520 opaque region
530 first pixel
550 second coded aperture optical coding pattern
600 electronic device
610 sensing system
620 electronic display
700 first step of method
710 second step of method
720 third step of method
730 fourth step of method
740 fifth step of method The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of various embodiments as set forth above, it should be understood that these embodiments are illustrative only and that the claims are not limited to those embodiments. Those skilled in the art will be able to make modifications and alternatives in view of the disclosure that are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A sensing system comprising:
first coded aperture configured to receive incident light and transmit a coded image;

a light replication component configured to detect the coded image and emit a replicated coded image;
a second coded aperture configured to receive the replicated coded image and transmit a decoded image;
a sensor configured to detect the decoded image,
wherein the light replication component comprises:
an incident light receiving surface and an opposed light emitting surface;
a substantially transparent planar substrate;
one or more bipolar junction transistors provided on the substantially transparent planar substrate, each transistor comprising a collector region adjacent to the light receiving surface, an emitter region adjacent to the light emitting surface, and a base region between the collector region and the emitter region; and
circuitry for biasing the bipolar transistors in use,
wherein each transistor is configured and biased in use so that the collector and base regions of the transistor operate as a photodiode while the base and emitter regions operate as a light emitting diode.

2. The sensing system of claim 1, wherein an optical coding pattern of the second coded aperture is an inverse pattern of an optical coding pattern of the first coded aperture.

3. The sensing system of claim 1, wherein the first coded aperture, the second coded aperture, or both comprises a random optical coding pattern.

4. The sensing system of claim 1, wherein the first coded aperture, the second coded aperture, or both comprises a Uniformly Redundant Array or a Modified Uniformly Redundant Array.

5. The sensing system of claim 1, wherein the first coded aperture and the second coded aperture comprise substantially identical patterns.

6. The sensing system of claim 1, wherein the first coded aperture, the second coded aperture, or both comprises a controllable display.

7. The sensing system of claim 1, wherein the second coded aperture is mounted on the sensor.

8. The sensing system of claim 1, wherein the light replication component comprises an incident light receiving surface and an opposed light emitting surface.

9. The sensing system of claim 1, wherein the light replication component comprises an organic photodiode, an organic phototransistor, or an organic light emitting diode.

10. An electronic device comprising the sensing system of claim 1.

11. A method of sensing light comprising:
receiving incident light via a first coded aperture and transmitting a coded image;
detecting the coded image;
emitting a replicated coded image in connection with a light replication component,
wherein the light replication component comprises:
an incident light receiving surface and an opposed light emitting surface;
a substantially transparent planar substrate;
one or more bipolar junction transistors provided on the substantially transparent planar substrate, each transistor comprising a collector region adjacent to the light receiving surface, an emitter region adjacent to the light emitting surface, and a base region between the collector region and the emitter region; and
circuitry for biasing the bipolar transistors in use,
wherein each transistor is configured and biased in use so that the collector and base regions of the transistor operate as a photodiode while the base and emitter regions operate as a light emitting diode;

receiving the replicated coded image via a second coded aperture and transmitting a decoded image; and detecting the decoded image.

12. A non-transitory computer readable medium storing computer readable instructions that, when executed by a processor, causes a computer to carry out the method according to claim 11.

* * * * *